United States Patent [19]

Haynes

[11] 4,019,183
[45] Apr. 19, 1977

[54] APPARATUS FOR LORAN SIMULATION

[75] Inventor: James R. Haynes, Lake City, S.C.

[73] Assignee: Kayot, Inc., Mankato, Minn.

[22] Filed: Sept. 17, 1975

[21] Appl. No.: 613,992

[52] U.S. Cl. .................................. 343/103; 35/10.2
[51] Int. Cl.² ............................................ G01S 1/24
[58] Field of Search ....................... 343/103; 35/10.2

[56] References Cited
UNITED STATES PATENTS

| | | | |
|---|---|---|---|
| 2,835,888 | 5/1958 | Frank .................................. | 343/103 |
| 3,665,086 | 5/1972 | Magee et al. .................................. | 343/103 |
| 3,743,754 | 7/1973 | Eisenberg .................................. | 343/103 |

*Primary Examiner*—Maynard R. Wilbur
*Assistant Examiner*—T. M. Blum
*Attorney, Agent, or Firm*—Williamson, Bains, Moore & Hansen

[57] ABSTRACT

A method and apparatus for simulating Loran signals are disclosed herein. The apparatus preferably comprises a portable, solid state testing unit which provides a simulated Loran signal for actuating conventional Loran receivers. The apparatus comprises an oscillator, a divider circuit responsive to the oscillator output for generating first and second trigger signals, and a pulse generator circuit for producing a simulated Loran master signal in response to the first trigger signal and a simulated Loran slave signal in response to the second trigger signal. Means are provided for mixing the simulated Loran pulse and slave signals to provide a composite Loran output signal. The method involved herein comprises the steps of generating simulated Loran master and slave signals and applying them directly to the R.F. front end of the Loran receiver under test, whereby resultant ringing of the receiver tank circuit enables the pulses to be passed through to interiorly located pulse detection and display systems.

5 Claims, 5 Drawing Figures

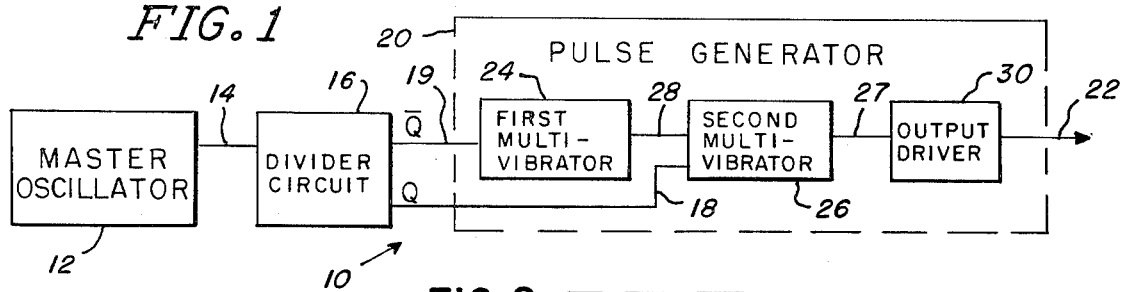
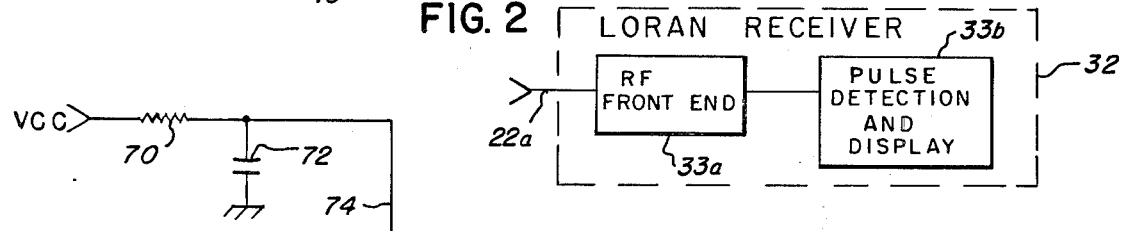
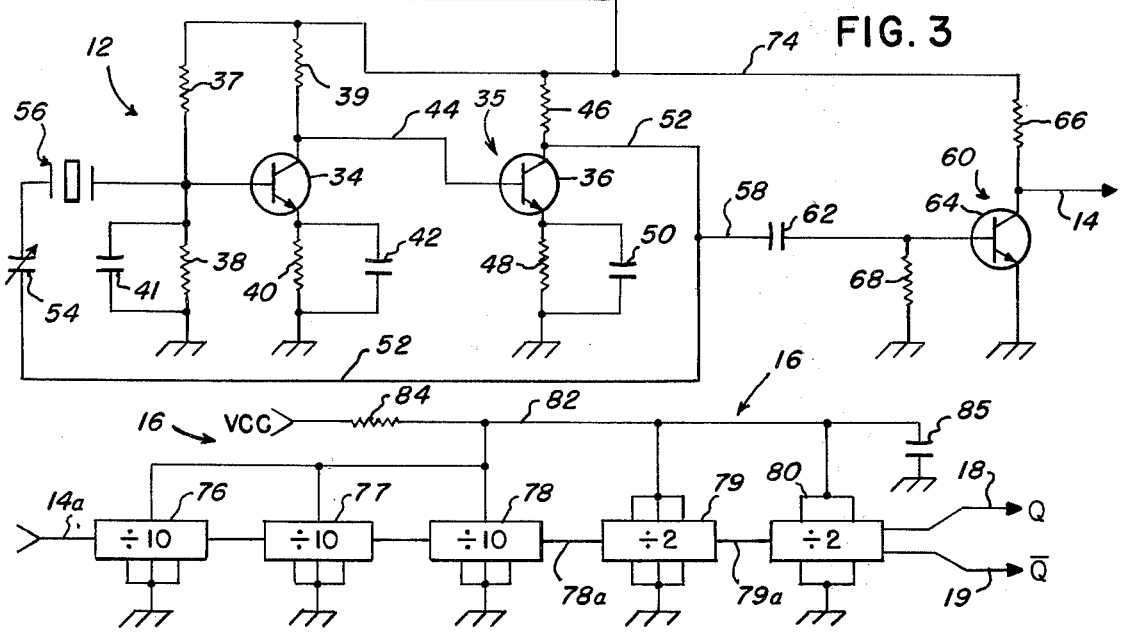
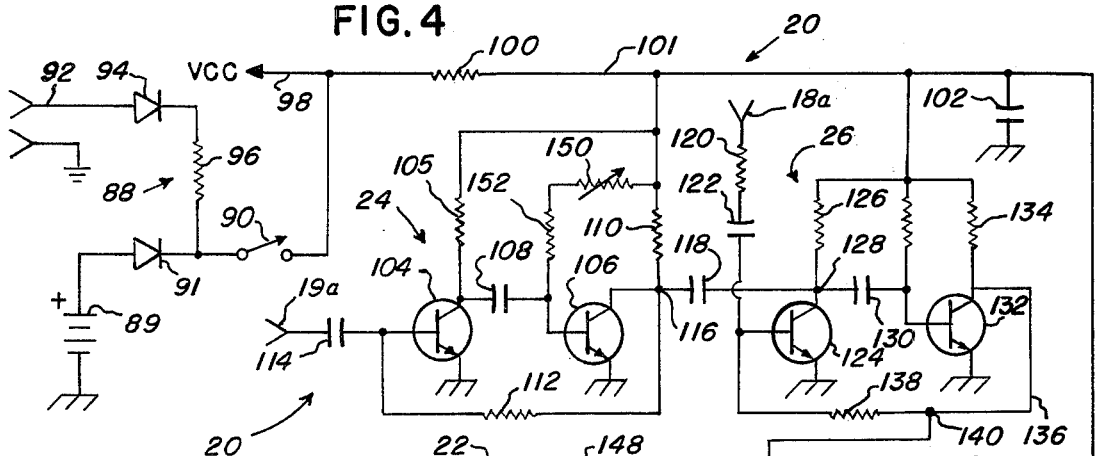

APPARATUS FOR LORAN SIMULATION

BACKGROUND OF THE INVENTION

This invention relates to Loran receivers. More particularly, the instant invention relates to apparatus for artificially simulating Loran navigation signals.

Loran is an abbreviation for "long-range navigation." A plurality of Loran radio stations is utilized for generating and transmitting pulse-modulated signals for reception by vessels wishing to electrically determine their geographical position. Loran-A systems operate on radio frequencies between 1800 and 2000 kilohertz, and transmit pulse-modulated radio waves. Loran navigation involves a master station and usually two slave stations which transmit time-delayed slave pulses in response to the master station.

To determine one's position through the use of Loran, hyperbolic lines of position are determined and/or plotted. The time difference between the master signal pulse and the subsequent slave signal pulse is determined, and a locus of points on a map may be plotted corresponding to that given time differential. The plot, which will be in the form of a hyperbola, indicates the locus of geographical points at which a given time difference between received master and slave pulses will be perceived. Subsequently, a second locus is plotted by computing the time differential between the master signal and a second slave signal. The intersection of the two hyperbolic loci thus generated will indicate the position of the vessel. Pulse positional navigational systems of this type are well known in the art and one example of such a system is shown in U.S. Pat. No. 2,855,594, issued to F. G. Bac on Oct. 7, 1958.

Sophisticated modern Loran or pulse-positional navigation receivers may comprise one or more R.F. input stages, a plurality of intermediate frequency amplifier stages, a detector stage and for eliciting time base information from the pulse modulation received thereby, and some sort of a display apparatus for visually aiding positional determination by reading out the derived time delay, for example. In modern Loran receivers the display apparatus comprises a cathode ray tube which is adapted to display the master and slave pulse signals and to aid the operator in synchronizing the receiver demodulation circuitry thereby determining the time differences between pulses necessary for plotting geographical position. Usually logic circuitry provided within the receiver will "decode" the pulse timing information and determine the time difference between received master and slave signals. Transistorized ring counters, for example, may be employed. The receiver operator must appropriately position the pulse signals on the diplay tube of the receiver. The display apparatus enables the operator to visually align the master and slave signal traces by adjustment to the receiver such that the pulse-detection network associated with the receiver will determine the time difference between pulses and thereby compute the proper hyperbolic navigational locus. When two or more locus lines are plotted in this manner, the intersection of the loci will indicate the position of the vessel.

Loran master signals are transmitted in the form of several "basic" pulse rates: H, L, S, SS, SH, SL, and SC. The most common rate, SS, involves the transmission of a master pulse every 100,000 microseconds, or 10 such pulses per second. The SC rate, for example, involves 20 master pulses per second. The L rate generates 25 master pulses per second. Loran systems also involve a "specific" rate which in effect yields more "range" to the measurement system. The specific rates run from SS 0 – SS 7. When a basic rate of SS is selected with a specific rate of SS 1, for example, master pulses are transmitted every 100,000-100 microseconds, or every 99,900 microseconds. Depending upon the pulse transmission rate of the received Loran station, the receiver must be adjusted to the appropriate "rates" to enable detection of the master-slave pulse delay differential.

In recent years, the price of Loran receivers has come down because of the advent of solid state design and construction techniques. Many modern salt water fishing and/or pleasure boats are now routinely equipped with Loran navigational aids. The Coastal areas of the United States are provided with a plurality of Loran transmitting stations so that reliable navigation through these areas is insured. As a result of the increasingly popular use of Loran receivers, there exists a definite need for a low-cost, easily operable portable Loran testing device which can be used for signal tracing, diagnostic testing and troubleshooting or the like. Unfortunately many of the prior art Loran testing systems are large, bulky heavy units which are unsuitable for portable operation. The bulkiness of some of these prior art units is at least in part due to their inclusion of an R.F. oscillator stage for generating an R.F. carrier signal between 1600 and 1800 kilocycles suitable for actuating typical Loran receivers. Also, pulse modulation circuitry is typically included to properly modulate the R.F. carrier.

SUMMARY OF THE INVENTION

The instant invention comprises a lightweight, portable solid state electronic testing apparatus which simulates a Loran pulse signal for actuating or testing Loran-A receivers. The apparatus preferably comprises a low frequency oscillator for generating a primary signal, a divider for generating a pair of complementary trigger signals in response to the primary signal, and a pulse generator comprising a pair of one-shot multivibrators for providing simulated Loran master and slave signals in response to the trigger signals. The apparatus includes means for mixing the simulated master and slave signals so that a composite Loran pulse signal is generated by the apparatus. The pulse-generator means preferably includes a variable delay circuit whereby the time delay between the simulated slave signal and the simulated master signal can be selectively varied by the operator. Consequently, the response of the Loran receiver under test to a plurality of simulated non-sectional points can be investigated by simple adjustment to the testing apparatus.

The method disclosed herein involves the steps of generating Loran pulse slave and master signals and applying them directly to the R.F. front end of the Loran receiver under test. I have found that by applying pulse signals of a suitable amplitude to the R.F. tank circuit of the receiver, resultant ringing of the tank circuit will enable enough of the pulse signals to be transmitted through the device's R.F. front end to the pulse positional demodulation circuitry therewithin to enable operation of the receiver. In this manner, I have obviated the necessity for an 1800–2000 khz. R.F. oscillator circuit within my apparatus and for the pulse modulator circuitry associated therewith.

Thus, an object of my invention is to provide a lightweight, solid state testing apparatus for Loran receivers.

Another important object of my invention is to provide a Loran testing apparatus of the character described which is adapted to provide a variety of simulated Loran signals so that the receiver under test may be subjected to a plurality of simulated Loran navigational loci.

Another object of this invention is to provide Loran simulator and testing apparatus of the character described which obviates the necessity for an 1800–2000 khz. R.F. oscillator and modulation means included therewithin. Importantly, I have found that by applying the pulse output of this invention directly to the R.F. front end of the receiver under test, the resultant ringing of the front end obviates the necessity for an R.F. oscillator signal to be applied thereto.

A related object is to provide a simplified and efficient method for testing Loran receivers.

These and other objects and advantages of this invention together with features of novelty appurtenant thereto will appear or become apparent in the course of the following description.

BRIEF DESCRIPTION OF THE DRAWINGS

In the following drawings, which form a part of the specification and are to be construed in conjunction therewith, and in which like reference numerals have been employed to indicate like parts in the various views:

FIG. 1 is a block diagram of an electronic Loran simulator constructed in accordance with the teachings of this invention;

FIG. 2 is a block diagram of a conventional LORAN receiver with which the instant invention may be successfully employed;

FIG. 3 is an electrical schematic diagram of the preferred oscillator circuitry employed by the apparatus;

FIG. 4 is an electrical schematic diagram of the preferred divider circuitry employed by the instant apparatus; and FIG. 5 is an electrical schematic diagram of the preferred pulse generator and output circuitry employed by the apparatus.

DETAILED DESCRIPTION OF THE DRAWINGS

Referring now to the drawings, the apparatus for simulating Loran signals is designated generally by the reference numeral 10 (FIG. 1). Apparatus 10 includes a preferably solid state master oscillator 12 which generates a primary signal having a predetermined frequency. The primary signal appears along line 14 and is delivered to a divider 16 which divides down the primary signal by a predetermined factor. One ouput of the divider comprises a Q signal appearing along an output line 18 and a complementary $\overline{Q}$ signal which appears along an output line 19. Pulse generator 20 is responsive to the Q and $\overline{Q}$ signals and outputs a simulated Loran signal on an output line 22.

Pulse generator 20 includes first and second monostable multi-vibrators 24 and 26. Multi-vibrator 24 produces a simulated Loran pulse slave signal in response to the $\overline{Q}$ trigger signal appearing on line 19. The simulated pulse slave signal is delivered on line 28 to multi-vibrator 26. Multi-vibrator 26 also receives the Q signal from line 18 and generates a simulated Loran pulse master signal in response thereto. Also, multi-vibrator 26 mixes the simulated Loran pulse slave and pulse master signals to produce a simulated Loran output signal which is delivered to a buffer-driver 30 via line 27. As will be described in more detail later, the amplified, simulated Loran pulse signal output appearing on line 22 is suitable for actuating a conventional Loran receiver 32 (FIG. 2) by connection to an R.F. input 22a thereof.

Oscillator 12 preferably comprises first and second oscillator transistors 34 and 36 respectively (FIG. 3). Transistor 34 is conventionally biased by a plurality of resistors 37 thru 40. R.F. bypass capacitors 41 and 42 are preferably connected across resistors 38 and 40 respectively. The output of transistor 34 appearing across collector load resistor 39 is delivered to an amplifying stage 35 through a line 44. Amplifier 35 includes transistor 36, biasing resistors 46 and 48 and an R.F. bypass capacitor 50. The output of transistor 36 appearing across collector resistor 46 is delivered via line 52 to a variable trimmer capacitor 54 and a series connected crystal 56, the opposite side of which is returned to the base of transistor 34. It is thus seen that line 52, capacitor 54, and crystal 56 comprise a positive feedback loop. The R.F. output from transistor 36 is delivered to a buffer stage 60 via a line 58 and a capacitor 62. Buffer stage 60 includes a transistor 64 which is conventionally biased by resistors 66 and 68. The output from amplifier stage 60 appears on line 14 which will be electrically connected to input line 14a of the subsequent divider circuitry (FIG. 4).

The operating frequency of oscillator 12 is determined primarily by crystal 56, and in the preferred embodiment the operating frequency is approximately 100 kilohertz. Rate calibration is initially set by adjustment of capacitor 54 for a stable pulse repetition rate. Resistor 70 and capacitor 72 comprise a low-pass filter which transmits circuit operating voltage to line 74 and prevents R.F. energy from entering the power supply. The oscillator output frequency of 100 kilohertz is selected for the Loran L rate (25 khz. master pulses); however, the oscillator frequency may be changed where necessary to simulate different Loran pulse rates.

Divider 16 (FIG. 4) comprises a plurality of sequentially interconnected downcounters 76 thru 80. Each of the counters is powered by connection to a line 82 which is interconnected to the power supply (FIG. 5) via a resistor 84. Capacitor 85 cooperates with the resistor 84 to provide low pass filtering.

Each of the counters 76 thru 78 preferably comprise divide-by-10 downcounters. Thus the 100 khz. input appearing at line 14a is divided by 1000 before appearing at the output of divider 78 along line 78a. In the preferred embodiment, the output of counter 78 is thus 100 kz. Counters 79 and 80 are preferably divide-by-two counters, comprising a double JK flipflop integrated circuit. Thus, the output of counter 79 appearing along line 79a is 50 hertz, and the complementary Q and $\overline{Q}$ outputs of counter 80 are each 25 hertz. The 25 hertz Q trigger signal appearing along line 18 is utilized by succeeding circuitry to develop a simulated pulse master signal. The complementary 25 hertz $\overline{Q}$ trigger signal appearing along line 19 is utilized by the apparatus to develop a simulated pulse slave signal.

Power is supplied to oscillator 12, divider 16, and to pulse generator 20 from a power supply 88 (FIG. 5). The power supply 88 preferably includes a battery 89 which connects to an on/off switch 90 through an isolation diode 91. When desired, power can be supplied to the apparatus via attachment to line 92, which connects to switch 90 through an isolation diode 94 and a voltage dropping resistor 96. In the preferred embodiment battery 89 is of approximately 6 volts, and line 92 is adapted to receive approximately 12–15 volts from an external source. Interference between the two power supplies is prevented by the isolating diodes 91 and 94. Thus VCC power is available to each element of the apparatus from line 98. Power is distributed to pulse generator 20 through a resistor 100 to a line 101. Capacitor 102 bypasses line 101.

Pulse generator 20 preferably comprises a pair of one-shot multi-vibrators 24 and 26. Multi-vibrator 24 comprises a first transistor 104 and a second transistor 106, which receives the output transistor from transistor 104 through a capacitor 108. The output of transistor 106, which is developed across collector resistor 110, is transmitted through a feedback resistor 112 into the base of transistor 104. Transistor 104 also receives the $\overline{Q}$ trigger signal which appears on lines 19 and 19a and is transmitted through coupling capacitor 114. Each time a $\overline{Q}$ trigger pulse signal appears on line 19a, the one-shot multi-vibrator 24 will be actuated and will output a simulated Loran pulse slave signal at node 116. The simulated slave signal will be transmitted via capacitor 118 to one-shot multi-vibrator 26.

Multi-vibrator 26 generates a simulated Loran pulse master signal in response to Q trigger signals appearing on line 18a. Q trigger signals enter multi-vibrator 26 from input line 18a and pass through resistor 120 and coupling capacitor 122 to the base of transistor 124, thereby actuating same.

The output of transistor 124, which is developed across load resistor 126 and appears at a node 128, is transmitted through a capacitor 130 to the base of a second transistor 132. The output of transistor 132, which is developed across a collector load resistor 134, is returned to the base of transistor 124 through a line 136 and a feedback resistor 138.

The simulated pulse slave signal delivered to node 128 through capacitor 118 is mixed with the simulated Loran pulse master signal generated within multi-vibrator 26. Mixing of the simulated Loran master and slave pulse signals yields a composite Loran signal which appears at node 140. An isolation amplifier 30, comprised of a transistor 142, a bias resistor 143, and a collector load resistor 144 receives the composite signal through a capacitor 146. The buffered output appears across resistor 144, and is delivered to output line 22 through a coupling capacitor 148. The composite simulated Loran signal appearing on line 22 is suitable for actuation of a variety of conventional Loran receivers.

In the preferred embodiment transistor 142 is biased just below cutoff by resistor 143. The signal transmitted through capacitor 146 will forward bias transistor 142 causing it to turn on very quickly. The low resistance of load resistor 144 (approximately 820 ohms in the preferred embodiment) enables transistor 142 to conduct with a very large instantaneous current flow, thereby outputting pulse "spikes."

In an actual Loran navigation system the time differential between received Loran master and slave pulse signals determines the operator's navigational line of position. When different slave signals are selected the time differential will vary. In order to approximate this, multi-vibrator 24 is provided with a variable delay means comprised of a variable resistor 150. Variable resistor 150 and resistor 152 are connected between line 101 and the base of transistor 106. When resistor 150 is varied the resultant change in bias to transistor 106 varies the operating point of the multi-vibrator. Consequently, the instant in time in which the multi-vibrator will be triggered in response to the $\overline{Q}$ signal inputted thereto will be varied. Thus, the simulated pulse slave signal can be delayed, and the time differential between the pulse slave and master signals can be modified. In the preferred embodiment the delay range is variable from approximately 3000 to 3500 microseconds.

In operation the apparatus is actuated by turning switch 90 to the "on" position. Output 22 must be connected to R.F. input line 22a of the receiver 32 under test. The Loran receiver 32 will of course include an R.F. front end 33a which will be comprised of one or more L/C tank circuits and a plurality of amplifying stages, and a pulse demodulation and display network 33b. Network 33b may include logic circuitry for determining or measuring the time differential between received master and slave signals as well as display apparatus (such as a cathode ray tube or the like) for enabling the operator to properly synchronize the detection circuitry. At any rate, once a Loran signal is properly tuned by front end 33a and network 33b is properly programmed by the receiver operator, the network 33b will demodulate the incoming signal and enable the operator to determine a geographical position line.

In the prior art it has been known to test Loran receivers by injecting simulated Loran pulse signals directly into the pulse demodulation and display network 33b. I have found that by applying simulated Loran pulse signals directly to the front end 33a of the Loran receiver under test, resultant ringing of the front end tank circuits will transmit enough energy through the apparatus to the demodulation network 33b therewithin for actuation of the receiver. My method is facilitated by utilizing a driver transistor 142 for producing the very large instantaneous current flows ("spikes") which are desirable for practice of my testing method.

Once the receiver 32 is actuated by application of a simulated Loran signal to line 22a thereof, the display apparatus of the receiver will indicate a simulated navigational position to the operator, who of course must perform routine receiver operation adjustments. Thus, the operation and response of a receiver may be tested. Importantly, the delay time between simulated master and slave signals generated within my apparatus 10 may be varied by adjustment to resistor 150. In this manner the response of the receiver 32 to different simulated Loran slave signals can be investigated. Therefore two or more navigational lines of position may be computed and the response of the receiver will be indicated. When the response of the receiver is compared to predetermined calibration charts, receiver inaccuracies will be readily determined.

While a preferred embodiment of the present invention has been described, it should be understood that various changes, adaptations and modifications may be made therein without departing from the spirit of the invention and the scope of the appended claims.

What is claimed is:

1. Solid state electronic apparatus for generating a simulated LORAN output signal for actuating and testing LORAN receivers, said apparatus comprising:

oscillator means for generating a primary signal having a predetermined frequency;

divider means for generating a Q trigger signal and a complementary $\overline{Q}$ trigger signal in response to said primary signal;

generator means for producing a simulated LORAN pulse slave signal in response to said $\overline{Q}$ trigger signal and a simulated LORAN pulse master signal in response to said Q trigger signal, said generator means comprising:

first multi-vibrator means responsive to said $\overline{Q}$ trigger signal for producing said simulated LORAN slave signal; and second multivibrator means responsive to said Q trigger signal for producing said simulated LORAN master signal; and means for coupling said first multivibrator means to said second multivibrator means thereby combining said simulated pulse slave signal and said simulated pulse master signal thereby providing said simulated LORAN output signal.

2. The combination as defined in claim 1 wherein said first multivibrator means comprises adjustable means for selectively time delaying said simulated LORAN pulse slave signal.

3. The combination as defined in claim 1 including an output driver amplifying stage biased just below cutoff for amplifying said simulated LORAN output signal, thereby generating pulse spikes sufficient for ringing the R.F. front end portion of a conventional LORAN receiver.

4. The combination as defined in claim 3 wherein said first multivibrator means includes adjustable means for selectively varying the time constant of said multivibrator thereby selectively time delaying said simulated LORAN pulse slave signal.

5. The combination as defined in claim 4 wherein said divider means comprises a plurality of sequentially interconnected down counters for dividing down said primary signal.

* * * * *